(12) United States Patent
Diao et al.

(10) Patent No.: US 10,886,756 B2
(45) Date of Patent: Jan. 5, 2021

(54) CHARGING SYSTEM, CHARGING METHOD, AND MOBILE TERMINAL BASED ON DUAL BATTERIES

(71) Applicant: JRD COMMUNICATION (SHENZHEN) LTD, Guangdong (CN)

(72) Inventors: Zhiming Diao, Guangdong (CN); Hongjie Tong, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 504 days.

(21) Appl. No.: 15/745,989

(22) PCT Filed: Apr. 18, 2017

(86) PCT No.: PCT/CN2017/080880
§ 371 (c)(1),
(2) Date: Jan. 18, 2018

(87) PCT Pub. No.: WO2018/058940
PCT Pub. Date: Apr. 5, 2018

(65) Prior Publication Data
US 2020/0083721 A1    Mar. 12, 2020

(30) Foreign Application Priority Data

Sep. 27, 2016 (CN) .......................... 2016 1 0852486

(51) Int. Cl.
*H02J 7/00* (2006.01)
*H01M 10/44* (2006.01)
*H02J 9/06* (2006.01)

(52) U.S. Cl.
CPC ......... *H02J 7/0021* (2013.01); *H01M 10/441* (2013.01); *H02J 7/007* (2013.01); *H02J 7/0045* (2013.01); *H02J 9/061* (2013.01)

(58) Field of Classification Search
CPC ........ H02J 7/007; H02J 7/0013; H02J 7/0021; H02J 7/0045; H02J 7/0047; H02J 9/06; H02J 9/061; H01M 10/441
(Continued)

(56) References Cited

U.S. PATENT DOCUMENTS 9,985,471 B2 * 5/2018 Jin ........................... H02J 9/061
2005/0116686 A1 * 6/2005 Odaohhara ........... H02J 7/0025
320/116
(Continued)

FOREIGN PATENT DOCUMENTS

CN 201282451 Y 7/2009
CN 202309150 U 7/2012
(Continued)

OTHER PUBLICATIONS

TI Pub, SLAS885A, Oct. 2012 (Year: 2012).*

*Primary Examiner* — Nathaniel R Pelton

(57) ABSTRACT

A charging system, a charging method, and a mobile terminal based on dual batteries are provided. The charging system based on dual batteries includes a main board and a backup battery; the main board has a main charging chip and a main battery arranged thereon; the backup battery has a secondary charging chip and a secondary battery arranged thereon. The main board further includes a USB connector configured to connect to a charger, and a switch configured to switch to a corresponding charging path based on an inserting state of the backup battery. When the backup battery is inserted, the main charging chip is controlled to charge the main battery, and the secondary charging chip is controlled to charge the secondary battery simultaneously. When the backup battery is pulled out, the main charging chip is controlled to charge the main battery.

12 Claims, 2 Drawing Sheets

(58) Field of Classification Search
USPC .......................................................... 320/103
See application file for complete search history.

(56) References Cited

U.S. PATENT DOCUMENTS

| | | | | |
|---|---|---|---|---|
| 2005/0162132 | A1* | 7/2005 | Nagasawa | ............... H02J 9/061 |
| | | | | 320/128 |
| 2009/0237338 | A1 | 9/2009 | Sumi | |
| 2009/0265570 | A1* | 10/2009 | Chen | ................... H02J 2207/40 |
| | | | | 713/340 |
| 2011/0055599 | A1* | 3/2011 | Zhao | ........................ G06F 1/263 |
| | | | | 713/300 |
| 2011/0241620 | A1* | 10/2011 | Lin | ........................ H02J 7/0022 |
| | | | | 320/112 |
| 2012/0019193 | A1* | 1/2012 | Yu | ............................. G06F 1/28 |
| | | | | 320/103 |
| 2012/0280648 | A1* | 11/2012 | Hwang | ................. H02J 7/0013 |
| | | | | 320/108 |
| 2012/0319487 | A1* | 12/2012 | Shah | ..................... H02J 7/0068 |
| | | | | 307/66 |
| 2014/0002028 | A1* | 1/2014 | Li | ........................... G06F 1/263 |
| | | | | 320/128 |
| 2014/0082394 | A1* | 3/2014 | Kitano | ................... G06F 1/263 |
| | | | | 713/324 |
| 2014/0192481 | A1* | 7/2014 | Wojcik | ...................... G06F 8/61 |
| | | | | 361/679.55 |

FOREIGN PATENT DOCUMENTS

| | | |
|---|---|---|
| CN | 101867198 B | 11/2012 |
| CN | 106451616 A | 2/2017 |

* cited by examiner

CHARGING SYSTEM, CHARGING METHOD, AND MOBILE TERMINAL BASED ON DUAL BATTERIES

CROSS-REFERENCE TO RELATED APPLICATIONS

The present application is a 35 U.S.C. § 371 National Phase conversion of International (PCT) Patent Application No. PCT/CN2017/080880 filed Apr. 18, 2017, which claims foreign priority of Chinese Patent Application No. 201610852486.0, filed on Sep. 27, 2016 in the State Intellectual Property Office of China, the contents of all of which are hereby incorporated by reference.

TECHNICAL FIELD

Embodiments of the present disclosure generally relate to mobile terminal charging technology, and in particular relate to a charging system, a charging method, and a mobile terminal based on dual batteries.

BACKGROUND

With the increasing requirements of customers for longer battery lives of smartphones, high-capacity batteries or dual batteries may be used in the smartphones, which can well meet the requirements of the customer for extending battery lives of the smartphones. However, in the smartphones having dual batteries on the market, a main battery and a secondary battery cannot be charged simultaneously, which brings inconvenience for users.

Therefore, the technical solution in the prior art needs to be developed and improved.

SUMMARY

Aiming at defects in the prior art that the main battery and the secondary battery cannot be charged simultaneously, or the like, an objective of the present disclosure is to provide a charging system, a charging method and a mobile terminal based on dual batteries, which are capable of switching to a corresponding charging path based on an inserting state of a backup battery integrated on a back cover, achieving a one-to-many charging solution, charging the main battery and the secondary battery simultaneously, and the greatly improving charging efficiency.

To achieve the above objective, the following technical solution may be utilized in the present disclosure.

According to one aspect of the present disclosure, a charging method based on dual batteries is provided, the charging method comprises the following.

A0, controlling, by a charge controller, a secondary battery to charge a main battery, when a charger is not connected; the charge controller being connected to a secondary charging chip; the charge controller further comprising an LED light set configured to display current power level information of the secondary battery;

A, Connecting a USB connector to a charger;

B, Switching, by a switch, to a corresponding charging path, based on an inserting state of a backup battery; when the backup battery is inserted, controlling a main charging chip to charge the main battery, and controlling the secondary charging chip to charge the secondary battery simultaneously; when the backup battery is pulled out, controlling the main charging chip to charge the main battery.

According to another aspect of the present disclosure, a charging system based on dual batteries is further provided. The charging system comprises a main board and a backup battery; the main board has a main charging chip and a main battery arranged thereon; the backup battery has a secondary charging chip and a secondary battery arranged thereon; the main board further comprises the following:

A USB connector, configured to connect to a charger.

A switch, configured to switch to a corresponding charging path based on an inserting state of the backup battery; when the backup battery is inserted, the main charging chip being controlled to charge the main battery, and the secondary charging chip being controlled to charge the secondary battery simultaneously; when the backup battery is pulled out, the main charging chip being controlled to charge the main battery;

The switch is connected to the USB connector, the main charging chip and the secondary charging chip; the main charging chip is further connected to the main battery; the secondary charging chip is further connected to the secondary battery.

According to another aspect of the present disclosure, a mobile terminal is further provided. The mobile terminal comprises the charging system based on the dual batteries described above.

Compared with the prior art, the present disclosure provides a charging system, a charging method and a mobile terminal based on the dual batteries. The charging system based on the dual batteries may comprise a main board and a backup battery. Wherein a main charging chip and a main battery may be arranged on the main board, and a secondary charging chip and a secondary battery may be arranged on the backup battery. A USB connector configured to connect to a charger, and a switch configured to switch to a corresponding charging path based on an inserting state of the backup battery may be further provided on the main board. When the backup battery is inserted, the main charging chip may be controlled to charge the main battery, and the secondary charging chip may be controlled to charge the secondary battery simultaneously. When the backup battery is pulled out, the main charging chip may be controlled to charge the main battery. Therefore, it is possible to switch to the corresponding charging path based on the inserting state of the backup battery, thereby achieving the one-to-many solution, charging the main battery and the secondary battery simultaneously, and improving the charging efficiency greatly.

DETAILED DESCRIPTION

Aiming at defects in the prior art that the main battery and the secondary battery cannot be charged simultaneously, or the like, an objective of the present disclosure is to provide a charging system, a charging method and a mobile terminal based on dual batteries, which are capable of switching to a corresponding charging path based on an inserting state of a backup battery integrated on a back cover. In this way, it is possible to achieve a one-to-many charging solution, the main battery and the secondary battery may be charged simultaneously, and the charging efficiency may be greatly improved.

In order to make the technical solution described in the embodiments of the present application more clearly and definitely, the technical solution of the present disclosure will be described in detail with reference to the drawings and embodiments. It should be understood that, the embodiments described below are only used for explanation, not for limitation.

Figure 1:
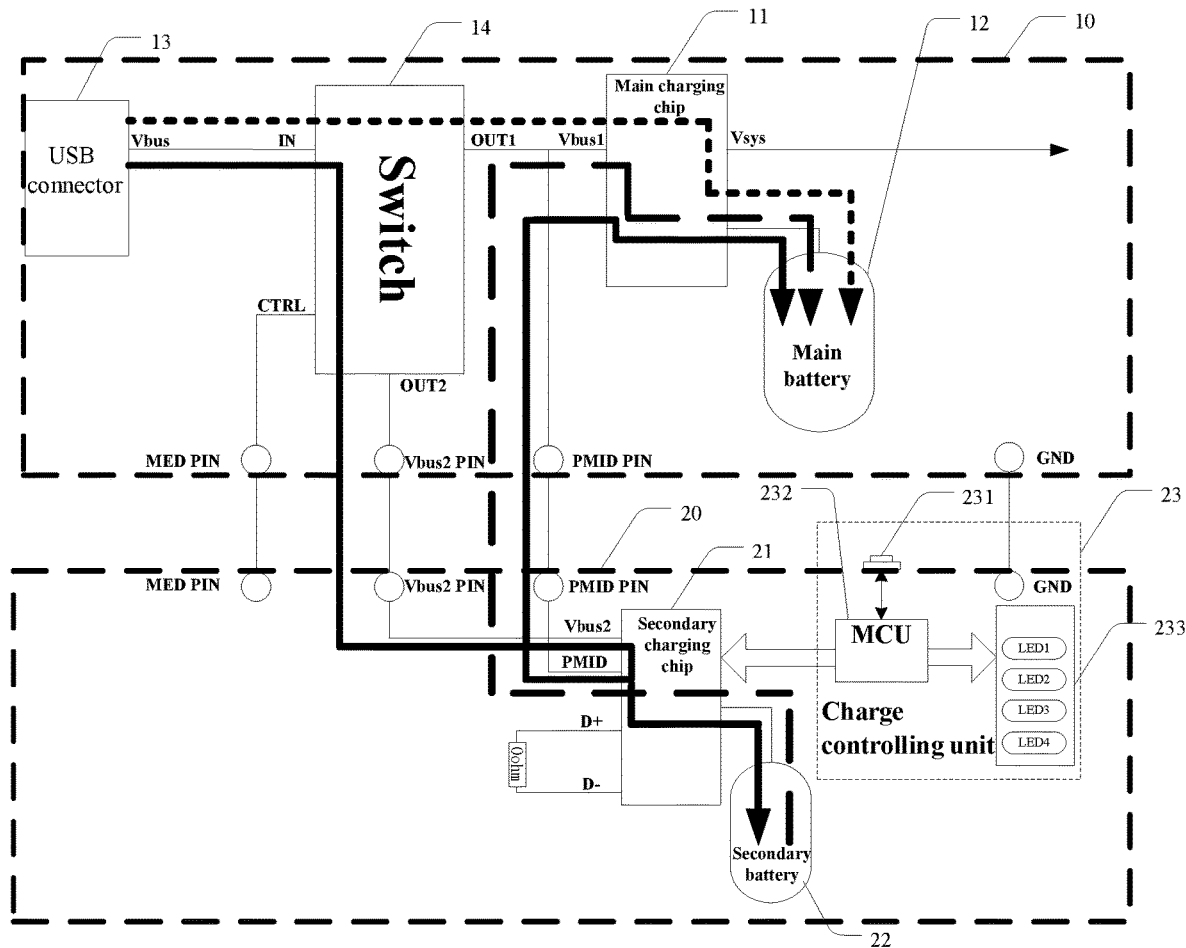
FIG. 1 is a block diagram showing a charging system based on dual batteries of the present disclosure.

Referring to FIG. 1, a charging system based on dual batteries provided in the present disclosure may include a main board 10 and a backup battery 20 integrated on a back cover. The main board 10 may have a main charging chip 11 and a main battery 12 arranged thereon, and may be configured as main power source of a mobile terminal to supply power to the mobile terminal. The backup battery 20 may have a secondary charging chip 21 and a secondary battery 22 arranged thereon, and may be configured as backup power source of the mobile terminal to supply power to the mobile terminal. The technical solution having dual batteries may meet the requirements of battery lives. In this embodiment, a USB connector 13 and a switch 14 may be further arranged on the main board 10. The switch 14 may be respectively connected to the USB connector 13, the main charging chip 11 and the secondary charging chip 21. The main charging chip 11 may be further connected to the main battery 12, and the secondary charging chip 21 may be further connected to the secondary battery 22. The USB connector 13 may be configured to connect to a charger. The switch 14 may be configured to switch to a corresponding charging path based on an inserting state of the backup battery 20. When the backup battery 20 is inserted, the main charging chip 11 may be controlled to charge the main battery 12, and the secondary charging chip 21 may be controlled to charge the secondary battery 22 simultaneously. When the backup battery 20 is pulled out, the main charging chip 11 may be controlled to charge the main battery 12. Therefore, it is possible to select the current charging path based on whether the backup battery 20 is inserted currently. When the backup battery 20 is inserted, it is possible to achieve the one-to-many solution which charges the main battery 12 and the secondary battery 22 simultaneously, thereby greatly improving the charging efficiency. Optionally, the secondary battery 22 may have a capacity of 3000 mAh; the main charging chip 11 may have a model of BQ2429X, while the secondary charging chip 21 may have a model of BQ24295. Of course, other charging chips having the same functions may also be implemented, and the present disclosure may not be intended to limit the model of the chip.

Furthermore, a charge controller 23 may be further arranged on the backup battery 20. The charge controller 23 may be connected to the secondary charging chip 21, and configured to control the secondary battery 22 to charge the main battery 12 when the charger is not connected. That is, when the charging system is not connected to the charger, and the secondary battery 22 still has power, the charge controller 23 may control the secondary battery 22 to charge the main battery 12. In this way, the mobile terminal may be supplied with power, and it is possible to ensure that the battery life of the mobile terminal may be extended normally, and running time of the mobile phone may be extended.

In practical application, the charging paths may be indicated by three line segments having arrows shown in FIG. 1. When the backup battery 20 is inserted, the main charging chip 11 may be controlled to charge the main battery 12, and the secondary charging chip 21 may be controlled to charge the secondary battery 22. At this time, the switch 14 may switch the paths, in such a way that the charging path may travel along a full line path (i.e., path OUT2) shown in FIG. 1. The charging path may travel along the components in following orders: the charger—the USB connector 13—the switch 14—a POGO Pin (Vbus2_pin) arranged between the main board 10 and the backup battery 20—a Vbus2 pin of the secondary charging chip 21. The charging path may further travel along the components in the following orders: the charger—the USB connector 13—the switch 14—the POGO Pin (Vbus2_pin) arranged between the main board 10 and the backup battery 20—the Vbus2 pin of the secondary charging chip 21—a PMID pin of the secondary charging chip 21—a POGO Pin (PMID_pin) arranged between the main board 10 and the backup battery 20—a Vbus1 pin of the main charging chip 11—the main battery 12/the main board 10. In this way, the main battery 12 and the secondary battery 22 may be charged simultaneously.

When the backup battery 20 is not inserted, or when the back cover is a common back cover without the secondary battery 22 integrated thereon, the main charging chip 11 may be controlled to charge the main battery 12. At this time, the switch 14 may switch the paths, in such a way that the charging path may travel along an intensive broken line path (i.e., path OUT1) shown in FIG. 1. The charging path may travel along the components in the following orders: the charger—the USB connector 13—the switch 14—the Vbus1 pin of the main charging chip 11—the main battery 12. In this way, the main battery 12 may be charged by the charger.

When the charger is not connected, and the backup battery 20 has been inserted, the secondary battery 22 may be controlled to charge the main battery 12, and the charging path may travel along a sparse broken line path shown in FIG. 1. The charging path may travel along the components in the following orders: the secondary battery 22—the PMID pin of the secondary charging chip 21—the POGO Pin (PMID_pin) arranged between the main board 10 and the backup battery—the Vbus1 pin of the main charging chip 11—the main battery 12/the main board 10. In this way, the secondary battery 22 may supply power to the main board 10 and further charge the main battery 12, and thus the requirement of the user for the battery life may be met.

In specific, the charge controller 23 may include a power key 231, an MCU 232 and an LED light set 233. The MCU 232 may be connected to the power key 231 and the secondary charging chip 21. The LED light set 233 may be connected to the MCU 232. Wherein the power key 231 may be configured to input a charge initiating instruction. The MCU 232 may be configured to initiate the secondary charging chip 21 based on the charge initiating instruction, and control the secondary battery 22 to charge the main battery 12. The LED light set 233 may be configured to display current power level information of the secondary battery 22. The power key 231 may be a physical button arranged on the backup battery 20. Instruction information input by the button may be defined. For example, when the button is shortly pressed down, the charge initiating instruction may be input. However, when the button is pressed down for a period of time longer than a preset period of time (such as 3s), a charge ending instruction may be input. When the MCU 232 receives the charge initiating instruction, the secondary charging chip 21 may be initiated, and thus the secondary battery 22 may be controlled to supply power to the main board 10 and further charge the main battery 12 based on the path indicated by the sparse broken line.

Meanwhile, in order to make the user clearly know the current power level of the secondary battery 22 and estimate the remaining battery life, the LED lighting set 233 having a plurality of LED lamp beads may be further provided to display the current power level information of the secondary battery 22. That is, the quantity of the LED lamp beads currently illuminated may be in proportion to the power level of the secondary battery 22, and thus the user may clearly know the currently remaining power level of the secondary battery 22 at one glance. Optionally, four LED lamp beads may be provided. Of course, the quantity of the LED lamp beads may be increased or decreased as required. In this embodiment, the MCU 232 may have a model of MSP430G2332, and the LED light set 233 may include a plurality of surface-mount LEDs having a model of LED0603.

Optionally, a low dropout linear regulator LD0 (not shown in the drawings) configured to regulate voltages and an over-current protective chip (not shown in the drawings) configured to provide current-limiting protection may be further arranged on the backup battery 20, in order to ensure the stability and security of charging. The low dropout linear regulator LD0 may have a model of SGM2021_3V, while the over-current protective chip may have a module of TPS2553.

Figure 2:
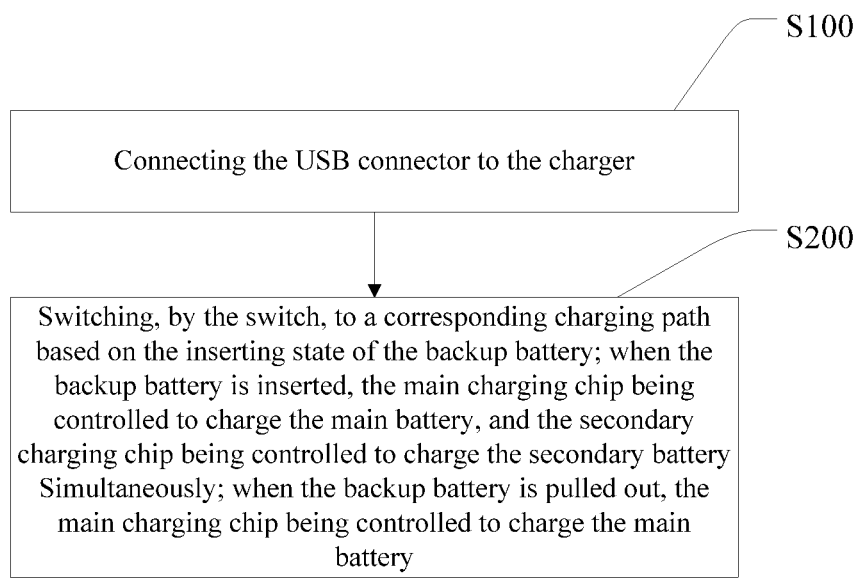
FIG. 2 is a flow chart of a charging method based on the dual batteries of the present disclosure.

A charging method based on the dual batteries may be further provided in the present disclosure using the charging system based on the dual batteries described above. As is shown in FIG. 2, the charging method based on the dual batteries may include the following blocks.

At block S100, the USB connector may be connected to the charger.

At block S200, the switch may switch to the corresponding charging path based on the inserting state of the backup battery. When the backup battery is inserted, the main charging chip may be controlled to charge the main battery, and the secondary charging chip may be controlled to charge the secondary battery simultaneously. When the backup battery is pulled out, the main charging chip may be controlled to charge the main battery.

Before the block S100, a further block may be provided.

At block S110, when the charger is not connected, the charge controller may control the secondary battery to charge the main battery, and the charge controller may be connected to the secondary charging chip.

In specific, the block S110 may further include the following blocks.

At block S111, a charge initiating instruction may be input by the power key.

At block S112, the MCU may initiate the secondary charging chip based on the charge initiating instruction, and control the secondary battery to charge the main battery.

At block S113, the current power level information of the secondary battery may be displayed by the LED lighting set.

Specific embodiments concerning the switch of the paths and the charging control may refer to the corresponding embodiments of the charging system aforesaid.

A mobile terminal may be further provided in the present disclosure. The mobile terminal may include the charging system based on the dual batteries described above. Since the charging system based on the dual batteries has been described in detail, the charging system will not be described in detail any more.

In conclusion, the present disclosure provides the charging system, the charging method and the mobile terminal based on the dual batteries. The charging system based on the dual batteries may include a main board and a backup battery. Wherein a main charging chip and a main battery may be arranged on the main board, and a secondary charging chip and a secondary battery may be arranged on the backup battery. A USB connector configured to connect to a charger, and a switch configured to switch to a corresponding charging path based on an inserting state of the backup battery may be further provided on the main board. When the backup battery is inserted, the main charging chip may be controlled to charge the main battery, and the secondary charging chip may be controlled to charge the secondary battery simultaneously. When the backup battery is pulled out, the main charging chip may be controlled to charge the main battery. Therefore, it is possible to switch to the corresponding charging path based on the inserting state of the backup battery, thereby achieving the one-to-many solution, charging the main battery and the secondary battery simultaneously, and improving the charging efficiency greatly.

It could be understood that, one skilled in the art may make many equivalents and modifications based on the technical solutions and inventive concept of the present disclosure. All these equivalents and modifications shall all be covered within the protection of the disclosure.

What is claimed is:

1. A charging method based on dual batteries, comprising:
   A0, controlling, by a charge controller, a secondary battery to charge a main battery, when a charger is not connected; the charge controller being connected to a secondary charging chip; the charge controller further comprising an LED light set configured to display current power level information of the secondary battery;
   A, connecting a USB connector to a charger;
   B, switching, by a switch, to a corresponding charging path, based on an inserting state of a backup battery;
   wherein when the backup battery is inserted, controlling a main charging chip to charge the main battery, and controlling the secondary charging chip to charge the secondary battery simultaneously;
      wherein the secondary charging chip is connected to the main charging chip; when the switch switches to the secondary charging chip, the charger charges to the secondary charging chip via the USB connector, and the secondary charging chip is controlled to charge the main charging chip simultaneously;
   when the backup battery is pulled out, controlling the main charging chip to charge the main battery.

2. The charging method based on the dual batteries of claim 1, wherein the step A0 further comprises:
   A01, inputting, by a power key, a charge initiating instruction;
   A02, initiating, by a microcontroller unit (MCU), the secondary charging chip based on the charge initiating instruction, and controlling the secondary battery to charge the main battery.

3. A charging system based on dual batteries, comprising a main board and a backup battery; the main board having a main charging chip and a main battery arranged thereon; the backup battery having a secondary charging chip and a secondary battery arranged thereon; the main board further comprising:
   a USB connector, configured to connect to a charger; and
   a switch, configured to switch to a corresponding charging path based on an inserting state of the backup battery;
      wherein the backup battery is inserted, the main charging chip being controlled to charge the main battery, and the secondary charging chip being controlled to charge the secondary battery simultaneously;

wherein the secondary charging chip is connected to the main charging chip; when the switch switches to the secondary charging chip, the charger charges to the secondary charging chip via the USB connector, and the secondary charging chip is controlled to charge the main charging chip simultaneously;

when the backup battery is pulled out, the main charging chip being controlled to charge the main battery;

the switch being connected to the USB connector, the main charging chip and the secondary charging chip; the main charging chip being further connected to the main battery; the secondary charging chip being further connected to the secondary battery.

4. The charging system based on the dual batteries of claim 3, wherein a charge controller is further arranged on the backup battery; the charge controller is configured to control the secondary battery to charge the main battery when the connector is not connected; the charge controller is connected to the secondary charging chip.

5. The charging system based on the dual batteries of claim 4, wherein the charge controller further comprises:

a power key, configured to input a charge initiating instruction; and a microcontroller unit (MCU), configured to initiate the secondary charging chip based on the charge initiating instruction, and control the secondary battery to charge the main battery;

the MCU is connected to the power key and the secondary charging chip.

6. The charging system based on the dual batteries of claim 5, wherein the charge controller further comprises an LED light set configured to display current power level information of the secondary battery; the LED light set is connected to the MCU.

7. The charging system based on the dual batteries of claim 5, wherein the MCU has a model of MSP430G2332.

8. A mobile terminal, comprising the charging system based on the dual batteries of claim 3.

9. The mobile terminal of claim 8, wherein a charge controller is further arranged on the backup battery; the charge controller is configured to control the secondary battery to charge the main battery when the connector is not connected; the charge controller is connected to the secondary charging chip.

10. The mobile terminal of claim 9, wherein the charge controller further comprises:

a power key, configured to input a charge initiating instruction; and a microcontroller unit (MCU), configured to initiate the secondary charging chip based on the charge initiating instruction, and control the secondary battery to charge the main battery;

the MCU is connected to the power key and the secondary charging chip.

11. The mobile terminal of claim 10, wherein the charge controller further comprises an LED light set; the LED light set is configured to display current power level information of the secondary battery; the LED light set is connected to the MCU.

12. The mobile terminal of claim 10, wherein the MCU has a model of MSP430G2332.

\* \* \* \* \*